United States Patent Office 2,875,107
Patented Feb. 24, 1959

2,875,107

TITANIFEROUS ORE TREATMENT

William Hammett Daiger, Arnold, Md., assignor to E. I. du Pont de Nemours and Company, Wilmington, Del., a corporation of Delaware No Drawing. Application February 21, 1956
Serial No. 566,770

5 Claims. (Cl. 134—25)

This invention relates to the treatment of titaniferous materials such as ilmenite and more particularly to novel methods for rendering titaniferous ores more amenable to chemical processing to recover therefrom titanium and other values.

Titanium exists in nature chiefly as the minerals rutile, arizonite and ilmenite. Rutile comprises substantially all titanium dioxide, whereas ilmenite and arizonite comprise titanium dioxide compounded with iron oxides. These minerals are found as massive rock deposits or as beach or sand-type ores. The ilmenite or titaniferous mineral is usually associated with large quantities of other materials such as silica sand from which it is separated prior to use. In mining ilmenite, recourse is had to conventional ore dressing procedures, such as gravity and hydraulic separations as well as electrostatic and electromagnetic separations from which a concentrate of the desired ilmenite fraction is recovered. This fraction can be ground and dissolved in strong sulfuric acid to yield water-soluble titanium compounds and solutions from which titanic acid and pigmentary $TiO_2$ can be recovered. Well-known examples of procedures for this purpose are disclosed in United States Patents 1,633,621, 1,889,027 and U. S. Reissue 18,854. Alternatively, the titaniferous material can be subjected to chlorination in the presence of a reducing agent to form titanium tetrachloride (United States Patents 2,184,887 and 2,701,179, etc.) from which $TiO_2$ or titanium metal values can be recovered (United States Patents 2,488,439 and 2,205,854, etc.).

The present invention is particularly concerned with the treatment of inland sands or Florida-type titaniferous ores. Geographically, these sands are derived from decomposition by weathering of rocks in upland areas which are transferred by streams to the sea. Ocean currents move these sands along to produce sand bars which when elevated and still washed by waves leave sand grains relatively clean and fresh to form beach deposits such as the well-known Quilon or Indian-type ilmenite. Elsewhere, however, the elevation of the land is such that old sand bars exist many miles inland from coastal areas and are rendered impure by reason of covering vegetation and long periods of contact with ground water carrying undesired contaminants in the form of chemical solutions. Sands of this type comprise those found in Clay, Bradford, Baker and Duval Counties, Florida, and especially the so-called Trail Ridge ores from that State. Similar deposits exist in Georgia, North Carolina and Virginia.

The Trail Ridge deposits, for example, lying near the surface of the ground yields a weathered or partly-oxidized ilmenite containing varying quantities of carbonaceous impurities. After clearing away vegetation and overlay the ore is dredged from the ground and subjected to gravity classification which yields a concentrate of the ilmenite sand in a heavy minerals fraction. This heavy minerals fraction is dried and subjected to electrostatic classification and then to electromagnetic classification to yield the ilmenite concentrate. When this concentrate is employed in the sulfuric acid process for producing titanium dioxide white pigment the ilmenite is first dried if necessary, ground and dissolved by an attack with strong sulfuric acid to produce a soluble mass. This mass is then dissolved in water to give a strong acid solution in which is suspended a considerable amount of insoluble material including carbonaceous material charred during the sulfuric acid attack. This insoluble material or mud is separated by settling in continuously operating settling tanks, such as Dorr thickeners. The mud in the underflow from these tanks is usually rewashed with dilute waste acids to recover residual titanium values. The clear underflow from these settling tanks is further concentrated and subjected to hydrolytic precipitation (United States Reissue 18,854) in which the acid solution is boiled in the presence of various colloidal seed materials. The hydrated titanium dioxide precipitated from this hydrolysis is then washed to free it from iron and other soluble impurities and most of the acid after which it is subjected to calcination and final grinding operations to produce a white titanium dioxide pigment.

In employing inland ilmenite sands in a sulfuric acid process for producing $TiO_2$ it has been found that considerable difficulty is encountered in the clarification of the sulfuric acid solution in the settling tanks prior to the hydrolysis stage of the process. This is in marked contrast to what is experienced when other ilmenite ores such as Quilon Indian beach sand or the massive Adirondack types of ore are used. This difficulty arises from the fact that the mud from the attack fails to settle satisfactorily or as well as mud derived from beach sand ores. In fact this difference is so great in many instances that existing equipment proves to be inadequate to handle the normal production of the plant.

I have found that if such inland ilmenite sand ores are subjected prior to such attack to treatment with an aqueous solution of an alkali metal hydroxide the disadvantageous settling problem theretofore encountered is readily and effectively overcome and that in consequence one thereby can effectively undertake a normal plant operation with the usual equipment and facilities.

More specifically, I have found that subjection of an inland titaniferous sand to the action of an aqueous sodium hydroxide solution followed by washing with water to remove the caustic medium is particularly effective in overcoming the above and other difficulties arising from the employment of ilmenite sands containing objectionable organic carbonaceous forms of contaminants.

In carrying out the invention, I preferably effect my contemplated caustic leach upon the crude heavy minerals concentrate prior to subjecting the same to any treating, particularly heating steps, such as drying, and while the sand is in the form of a rather concentrated slurry maintained under conditions of strong agitation. Ilmenite sand slurries used may range from 25–75% by weight although I prefer to employ from about 50–60% slurries. Caustic treatment can be effected at any desired temperature ranging from room up to boiling but preferably the treatment is effected at the available water temperature. The ore is held in the caustic solution for as long as one hour prior to dilution and washing with a preferred time of treatment ranging from about 1–30 minutes. The concentration of the alkali or caustic solution used may vary from about .01 to 20%, but preferably ranges from between .05 to 5.0% based on the weight of the ilmenite sand under treatment. The mineral grains treated can range in size from about 200–30 mesh and can be carried out either in a single vessel or in a series of vessels with the slurry being preferably agitated for at least a portion of the time during contact with the caustic solution.

My caustic washing step shows most advantageous results when applied prior to the electrostatic and electromagnetic separating steps. However, it is also advantageously useful if applied after the separation steps but prior to the sulfuric dissolving step.

To a clearer understanding of the invention the following specific examples are given which are merely illustrative of and not to be construed as in any wise limiting the underlying principles of my invention:

*Example I*

An inland Trail Ridge, Florida, ilmenite sand was treated during its recovery and concentration in the operation described at pages 789-795 in Mining Engineering, August 1953, by adding sodium hydroxide to the scrubbers employed in such recovery operation. These scrubbers are shown on the flow sheet appearing at page 791 of the publication mentioned, being denominated therein "dewatering and scrubbing." They consist of tanks, each of which is equipped with powerful impeller agitators to maintain the sand in suspension during its continuous passage through the scrubbers. In the treatment, the dewatered sand from the preceding rake classifiers was fed into the agitated tanks along with enough water to produce a slurry of about 60% by weight of solids and enough NaOH to maintain about a 0.1% solution. This caustic slurry was passed through three such units in series and was retained in each unit an average of 3 minutes. The caustic slurry was then diluted with enough water to reduce the solids content to 30% in a single large agitated tank supplied for this purpose and was then fed to washing type rake classifiers to remove at least 90% of the caustic and accompanying slimes. The washed ilmenite sand was then subjected to conventional treatment consisting of drying in coal-fired dryers, electrostatic separation and electromagnetic separation to give ilmenite fractions ranging from 60 to 80% $TiO_2$. This ilmenite was employed in the manufacture of titanium dioxide pigment by a sulfate process in which the dry sand was ground to about 90%-325 mesh and dissolved in sulfuric acid in accordance with the procedures described in U. S. Patent 1,889,027. The resulting solution was then partially reduced with scrap metal (iron) and clarified in continuous settling tanks as described in U. S. Patent 2,280,590, using copper sulfate and ferrous sulfide as the clarifying agents as contemplated in U. S. Patent 1,633,621. This dissolving procedure was compared with an identical procedure carried out on the same Trail Ridge sand but which had not been treated with caustic and washed. The benefits arising from this invention are apparent from the following comparative table:

| Comparison at First Clarification [1] | NaOH Treated | Untreated |
| --- | --- | --- |
| Percent recovery of total $TiO_2$ values in the overflow solution | 90 | 85 |
| Relative capacity of same settling tank, percent | 100 | 70 |
| Relative volume of underflow mud per unit $TiO^2$ recovered in overflow | 1 | 1.55 |

[1] First clarification refers to the major separation of insolubles from the crude sulfuric acid solution by sedimentation. The resulting solution (overflow) is again filtered to remove traces of solids.

*Example II*

Example I was duplicated with equivalent advantageous results, employing a .1% solution of potassium hydroxide in lieu of the sodium hydroxide employed in that example.

Although the invention has been described in its application to certain preferred, specific embodiments, it will be understood that it is not restricted thereto. For example, although it is especially adaptable for the treatment of inland sand types of titaniferous ores it can also be applied to other titaniferous minerals including those mentioned above as well as Lucoxene, ilmenite, arizonite and rutile, etc. Similarly, though specific caustic reagents have been mentioned for use, it will be evident that the invention is generally applicable to and contemplates the utilization of alkali metal hydroxides generally including sodium hydroxide, potassium hydroxide, lithium hydroxide, etc.

In addition to the advantages mentioned concerning sedimentation clarification in the sulfuric acid process for obtaining pigmentary $TiO_2$, the invention also affords other advantages. In addition to rendering the ilmenite satisfactorily pure for solubilization with sulfuric acid, it also renders the ore more amenable for other chemical treatments including chlorination thereof to produce titanium tetrachloride. For example, by treating the ore with caustic as in Example I, the subsequent electrostatic separation is rendered cleaner and a yield of product of significantly higher $TiO_2$ content. This cleaner product has the advantage of reducing the chemical costs in later processing. Thus, in the chlorination of the ilmenite, the consumption of chlorine by non-titaniferous materials is substantially decreased, often as much as 50%. The caustic treatment of this invention appears to be uniquely suited for treatment of the inland ilmenite sands. Although the new treatment is relatively simple, the resulting improvements have been of considerable assistance in the commercial recovery of important titanium values from a low grade ilmenite deposit containing less than 4% of titaniferous minerals.

I claim:

1. A method for treating titaniferous sand type ores the mineral grains of which range in size from about 200-30 mesh which comprises agitating the ore in a dilute aqueous alkali hydroxide solution at a strength ranging from .01-20 weight percent and thereafter washing the treated ore with water.

2. A method for treating titaniferous sand type ore the mineral grains of which range in size from about 200-30 mesh to improve the recovery of titanium values therefrom which comprises subjecting said ore to agitation in the presence of a dilute aqueous solution of caustic at a strength ranging from between 0.1 and 20 of the weight percent and thereafter washing the caustic treated ore with water to remove caustic therefrom.

3. A method for purifying an inland titaniferous sand ore the mineral grains of which range in size from about 200-30 mesh which comprises agitating said ore from about 1-30 minutes in dilute sodium hydroxide solution at a strength ranging between .01 and 20 weight percent, and thereafter washing the treated product with water to remove sodium hydroxide therefrom.

4. A method for purifying a sand type titaniferous ore the mineral grains of which range in size from about 200-30 mesh which comprises agitating a slurry of said ore in the range of from 25-75% by weight in a dilute aqueous caustic solution at a strength ranging from .01 to 20 weight percent and thereafter washing the treated ore with water to remove the caustic solution therefrom.

5. The method of claim 4 in which the titaniferous sand slurry concentration ranges from 50-60 weight percent and the amount of caustic present ranges from .05-5.0% of the weight of the ore.

References Cited in the file of this patent

UNITED STATES PATENTS

| | | |
| --- | --- | --- |
| 1,760,992 | Palmer | June 3, 1930 |
| 2,724,667 | MacPherson | Nov. 22, 1955 |

UNITED STATES PATENT OFFICE
CERTIFICATE OF CORRECTION

Patent No. 2,875,107                                   February 24, 1959

William Hammett Daiger

It is hereby certified that error appears in the printed specification of the above numbered patent requiring correction and that the said Letters Patent should read as corrected below.

Column 4, line 55, after "dilute" insert -- aqueous --.

Signed and sealed this 22nd day of March 1960.

(SEAL)
Attest:

KARL H. AXLINE                                              ROBERT C. WATSON
Attesting Officer                                          Commissioner of Patents